(12) United States Patent
Takeuchi et al.

(10) Patent No.: US 9,015,524 B2
(45) Date of Patent: Apr. 21, 2015

(54) CONTROL DEVICE AND DATA STORAGE DEVICE HAVING A PLURALITY OF MEMORIES AND ERROR CORRECTION WHERE A DATA LENGTH AND A CODE LENGTH ARE SET TO TEND TO BE LONGER AS A NUMBER OF WRITES AND ERASES INCREASES

(75) Inventors: Ken Takeuchi, Tokyo (JP); Mayumi Fukuda, Tokyo (JP)

(73) Assignee: The University of Tokyo, Tokyo (JP)

( * ) Notice: Subject to any disclaimer, the term of this patent is extended or adjusted under 35 U.S.C. 154(b) by 608 days.

(21) Appl. No.: 13/204,215

(22) Filed: Aug. 5, 2011

(65) Prior Publication Data
US 2012/0042200 A1 Feb. 16, 2012

(30) Foreign Application Priority Data

Aug. 11, 2010 (JP) .................................. 2010-180282

(51) Int. Cl.
*G06F 11/10* (2006.01)

(52) U.S. Cl.
CPC .................................. *G06F 11/1004* (2013.01)

(58) Field of Classification Search
USPC .................. 714/6.1, 6.11, 752, 763, 6.2, 6.24
See application file for complete search history.

(56) References Cited

U.S. PATENT DOCUMENTS

| 5,583,500 | A * | 12/1996 | Allen et al. ..................... 341/107 |
| 6,567,364 | B1 * | 5/2003 | Takahashi et al. ............... 369/95 |
| 7,788,572 | B1 * | 8/2010 | Ulriksson ...................... 714/795 |
| 8,065,598 | B1 * | 11/2011 | Gunnam et al. ............... 714/800 |
| 8,806,108 | B2 * | 8/2014 | Suzuki et al. ................. 711/103 |
| 2003/0066013 | A1 * | 4/2003 | Maple et al. ................... 714/771 |
| 2006/0248434 | A1 * | 11/2006 | Radke et al. .................. 714/763 |
| 2006/0274566 | A1 | 12/2006 | Takashima et al. |
| 2007/0033378 | A1 * | 2/2007 | Sinclair et al. ................ 711/203 |
| 2008/0104459 | A1 | 5/2008 | Uchikawa et al. |
| 2009/0210612 | A1 * | 8/2009 | Nakanishi et al. ............ 711/103 |
| 2011/0289385 | A1 * | 11/2011 | Takeuchi et al. .............. 714/764 |

FOREIGN PATENT DOCUMENTS

| JP | A-2006-338370 | 12/2006 |
| JP | A-2008-108356 | 5/2008 |
| WO | WO 2007/105688 A1 | 9/2007 |

OTHER PUBLICATIONS

Wikipedia's Hard Disk Drive version from Aug. 4, 2010 http://en.wikipedia.org/w/index.php?title=Hard_disk_drive&oldid=377065101.*
Impelmentation of Reed Solomon Error Correcting Codes by Mohit Agrawal May 17, 2011 (as found by Google, see search results at the last page of reference) http://ethesis.nitrkl.ac.in/2400/1/final_thesis.pdf.*
Takashima et al. "A 128Mb ChainFeRAM™ and System Designs for HDD Application and Enhanced HDD Performance," IEEE Asian Solid-State Circuits Conference, Nov. 16-18, 2009, pp. 13-16, Taipei, Taiwan.

* cited by examiner

*Primary Examiner* — Joseph Schell
(74) *Attorney, Agent, or Firm* — Oliff PLC

(57) ABSTRACT

The SSD performs to encode input data from the host device into BCH code having data length and code length sequentially and controls RRAM to stores the encoded data when the write requesting signal is input from the host device. When the number of BCH code that becomes data of one page of the flash memory after being decoded is stored to RRAM, the SSD controls RRAM to read out data stored in RRAM, performs error correction and decoding to the read data as BCH code having the data length and the code length, and controls the flash memory to store the encoded data.

9 Claims, 3 Drawing Sheets

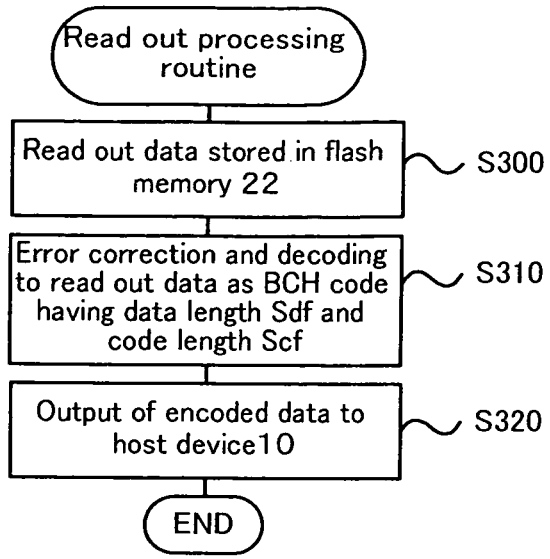
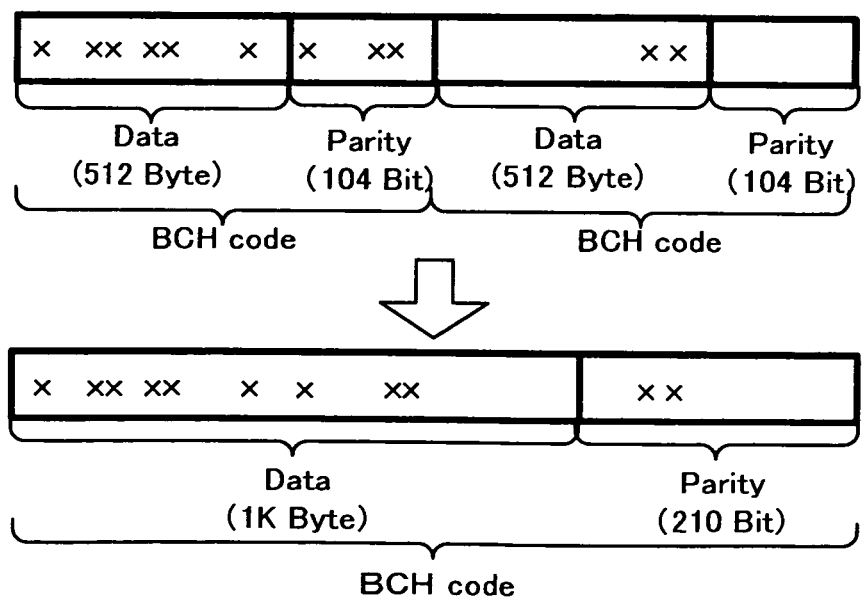

CONTROL DEVICE AND DATA STORAGE DEVICE HAVING A PLURALITY OF MEMORIES AND ERROR CORRECTION WHERE A DATA LENGTH AND A CODE LENGTH ARE SET TO TEND TO BE LONGER AS A NUMBER OF WRITES AND ERASES INCREASES

BACKGROUND OF THE INVENTION

1. Field of the Invention

The present invention relates to a control device and a data storage device, for details, a control device configured to control data transfer between a host device, a first storage configured as a nonvolatile storage for storing data, and a second storage configured as a nonvolatile random access memory having faster write speed than the first storage, and a data storage having such a control device.

2. Description of the Prior Art

One proposed structure of a control device controls a FeRAM (Ferroelectric Random Access Memory) as a cache memory or HDD to store data from a PC system (see, for example, Non-Patent Document 1). In the structure, the FeRAM is configured as a nonvolatile random access memory maintaining data stored therein when a power supply is stopped. In this device, data in the FeRAM is not regularly needed to be evacuated to HDD in preparation to an unexpected stop power supply. This arrangement enables to increase amount of data stored to FeRAM, and to increase cash hit ratio.

Non-patent document 1: Daisaburo Takahashi et al. "A 128 Mb ChainFeRAM™ and System Designs for HDD Application and Enhanced HDD Performance", IEEE Asian Solid-State Circuits Conference, Nov. 16-18, 2009, Taipei, Taiwan.

In the device described above, data is input from PC system relatively fast, and a write speed in writing the input data to the HDD is relatively low. When data is input from the PC system, acceptance of input of data from PC system is stopped at once. After the input data is written to the HDD, the acceptance of input of next data is restarted. In this case, a write speed in writing the input data from the PC system to the HDD is limited by a writing speed of the HDD. So it is desirable to have a large increase in data write speed.

SUMMARY OF THE INVENTION

In a control device and a data storage, there would thus be demand for increasing a data write speed.

The present invention accomplishes at least part of the demand mentioned above and the other relevant demands by the following configurations applied to the control device and the data storage.

According to one aspect, the present invention is directed to a control device configured to control data transfer between a host device, a first storage configured as a nonvolatile storage for storing data, and a second storage configured as a nonvolatile random access memory having faster write speed than the first storage. The control device has: a memory processing unit for the second storage configured to encode input data from the host device sequentially into an error correcting code for the second storage and control the second storage to store the encoded data to the second storage sequentially when a write request signal requesting to write data to the first storage is input from the host device; a read processing unit for the second storage configured to control the second storage to read out predetermined sized data stored in the second storage when size of data stored in the second storage reaches the predetermined size; and a memory processing unit for the first storage configured to perform error correction and decoding on the read data as the error correcting code for the second storage, and control the first storage to store the decoded data.

In the control device according to this aspect of the invention, the control device encodes the input data from the host device sequentially into the error correcting code for the second storage and controls the second storage to store the encoded data to the second storage sequentially when the write request signal requesting to write data to the first storage is input from the host device. The control device controls the second storage to read out the predetermined sized data stored in the second storage when the size of data stored in the second storage reaches the predetermined size. The control device performs error correction and decoding on the read data as the error correcting code for the second storage, and controls the first storage to store the decoded data. The control device inputs data from the host device sequentially until the size of data stored in the second storage reaches the predetermined size. After the size of data stored in the second storage reaches the predetermined size and the predetermined sized data stored in the second storage is read out, the control device inputs data from the host device sequentially. Thus increase of data write speed is accomplished. The control device also encodes the input data from the host device sequentially into the error correcting code for the second storage, controls the second storage to store the encoded data to the second storage sequentially, performs error correction and decoding on the read data as the error correcting code for the second storage, and controls the first storage to store the decoded data. This device enables the first storage to store more correct data. Thus increase of data write speed is properly accomplished.

In the control device according to this aspect of the invention, the control device has a number of write and erase times counting unit for the second storage configured to count number of write and erase times for the second storage. The number of write and erase times for the second storage is a sum of the number of write times of data in the second storage. The number of erase times of data is stored in the second storage. The control device further has a code length of data setting unit configured to set a data length for execution and a code length for execution to tend to be longer as the number of write and erase times for the second storage increases. The data length for execution is a length of input data from the host device encoded into the error correcting code for the second storage. The code length for execution being a code length of input data from the host device encoded into the error correcting code for the second storage. In the controls device, the memory processing unit for the second storage encodes the input data from the host device into the error correcting code for the second storage having the set data length for execution and the set code length for execution, and the memory processing unit for the first storage performs error correction and decoding on the read data as the error correcting code for the second storage having the set data length for execution and the set code length for execution. The second storage seems to deteriorate with increase of the number of write and erase times for the second storage, and the more error seems to be occurred because it is impossible to write normally in writing data. This is because the second storage is a nonvolatile random access memory. The device sets the data length for execution and the code length for execution to tend to be longer as the number of write and erase times for the second storage increases, encodes the input data from the host device into the error correcting code for the second storage having the set data length for execution and the set code length for execution, and performs error correction and decoding on the read data as the error correcting code for the second storage having the set data length for execution and the set code length for execution. Thus the device is able to collect more errors, and enables the first storage to store more correct data.

In the control device according to this aspect of the invention, the error correcting code for the second storage is any one of BCH code, block code or convolutional code.

In the control device according to this aspect of the invention, the predetermined size is size of the error correcting code for the second storage corresponding to preset size as size of data written in the first storage in one write processing.

In the control device according to this aspect of the invention, the control devise further has a read processing unit for the first storage configured to control the first storage to read out data stored in the first storage and to output the read data to the host device when a readout request signal requesting to read out data stored in the first storage is input from the host device. The memory processing unit for the first storage encodes the decoded data into an error correcting code for the first storage and controls the first storage to store the encoded data to the first storage. The error correcting code for the first storage correcting more errors than the error correcting code for the first storage corrects. The read processing unit for the first storage performs error correction and decoding on the read data as the error correcting code for the first storage, and outputs the decoded data to the host device. Thus assured error collection and output of more correct data to the host device are accomplished when the error occurs in the data stored in the first storage. Generally, in error correction by an Error Correcting Code, the less number of errors is, the shorter the processing time of error correction is. Also the less number of errors is, the smaller the consumption power for process is. By using error correcting code correcting more errors than the error correcting code for the second storage as the error correcting code for the first storage, i.e., by using error correcting code correcting less errors than the error correcting code for the first storage as the error correcting code for the second storage, compared to using error correcting code same as the error correcting code for the first storage and correcting comparatively more errors as the error correcting code for the second storage, the control device accomplishes the shorter processing time of error correction correcting the read data from the second storage and the smaller consumption power of the error correction.

In the control device having the read processing unit for the first storage according to this aspect of the invention, the control device further has a number of write and erase times counting unit for the first storage configured to count number of write and erase times for the first storage. The number of write and erase times for the first storage is a sum of the number of write times of data in the first storage and the number of erase times of data stored in the first storage. The control device further has a code length of data setting unit for the first storage configured to set a data length for execution for the first storage and a code length for execution for the first storage to tend to be longer as the number of write and erase times for the first storage increases. The data length for execution for the first storage is a length of decoded data encoded into the error correcting code for the first storage. The code length for execution for the first storage is a code length of the decoded data encoded into the error correcting code for the first storage. In the control device, the memory processing unit for the first storage encodes the decoded data into the error correcting code for the first storage having the set data length for execution for the first storage and the set code length for execution for the first storage, and the read processing unit for the first storage performs error correction and decoding on the read data as the error correcting code for the first storage having the set data length for execution for the first storage and the set code length for execution for the first storage. In the first storage, the more number of write and erase times for the first storage causes the first storage to deteriorate. Thus errors caused by not being able to write in writing data are occurred in more bits. The control device sets the data length for execution for the first storage and the code length for execution for the first storage to tend to be longer as the number of write and erase times for the first storage increases, encodes the decoded data into the error correcting code for the first storage having the set data length for execution for the first storage and the set code length for execution for the first storage, and performs error correction and decoding on the read data as the error correcting code for the first storage having the set data length for execution for the first storage and the set code length for execution for the first storage. Thus error collection to more errors and output of more correct data to the host device are accomplished when the data stored in the first storage is read out. In this aspect of the invention, the error correcting code for the first storage is any one of BCH code, block code or convolutional code.

According to one aspect, the present invention is directed to a data storage having the control device according to the above aspect of the invention. The control device configured to control data transfer between a host device, a first storage configured as a nonvolatile storage for storing data, and a second storage configured as a nonvolatile random access memory having faster write speed than the first storage, the control device having: a memory processing unit for the second storage configured to encode input data from the host device sequentially into an error correcting code for the second storage and control the second storage to store the encoded data to the second storage sequentially when a write request signal requesting to write data to the first storage is input from the host device; a read processing unit for the second storage configured to control the second storage to read out predetermined sized data stored in the second storage when size of data stored in the second storage reaches the predetermined size; and a memory processing unit for the first storage configured to perform error correction and decoding on the read data as the error correcting code for the second storage, and control the first storage to store the decoded data. The data storage further has a flash memory as the first storage and the second storage.

In the data storage according to this aspect of the invention, the data storage has the control device according to the above aspect of the invention. The present invention accomplishes at any one part of the demand mentioned above by the following configuration applied to the control device, for example, the demand of properly increase of data write speed in writing data from the host device to the first storage.

According to another aspect, the present invention is directed to a data storage having the control device according to the above aspect of the invention. The control device configured to control data transfer between a host device, a first storage configured as a nonvolatile storage for storing data, and a second storage configured as a nonvolatile random access memory having faster write speed than the first storage, the control device having: a memory processing unit for the second storage configured to encode input data from the host device sequentially into an error correcting code for the second storage and control the second storage to store the encoded data to the second storage sequentially when a write request signal requesting to write data to the first storage is input from the host device; a read processing unit for the second storage configured to control the second storage to read out predetermined sized data stored in the second storage when size of data stored in the second storage reaches the predetermined size; and a memory processing unit for the first storage configured to perform error correction and decoding on the read data as the error correcting code for the second storage, and control the first storage to store the decoded data. The data storage further has a hard disk drive as the first storage; and the second storage.

In the data storage according to this aspect of the invention, the data storage has the control device according to the above aspect of the invention. The present invention accomplishes at any one part of the demand mentioned above by the following configuration applied to the control device, for example, the demand of properly increase of data write speed in writing data from the host device to the first storage.

In the data storage according to these aspect of the invention, the second storage is anyone of a resistance random access memory, a ferroelectric random access memory, a magnetoresistive random access memory, or a phase change memory.

BRIEF DESCRIPTION OF THE DRAWING

FIG. 5 schematically illustrates a flow chart showing read out processing routine executed by memory controller 30 of the SSD 20.

FIG. 6 schematically illustrates the configuration of generation of bit error in data stored in RRAM 24.

DESCRIPTION OF THE PREFERRED EMBODIMENT

One mode of carrying out the invention is described below as a preferred embodiment.

Figure 1:
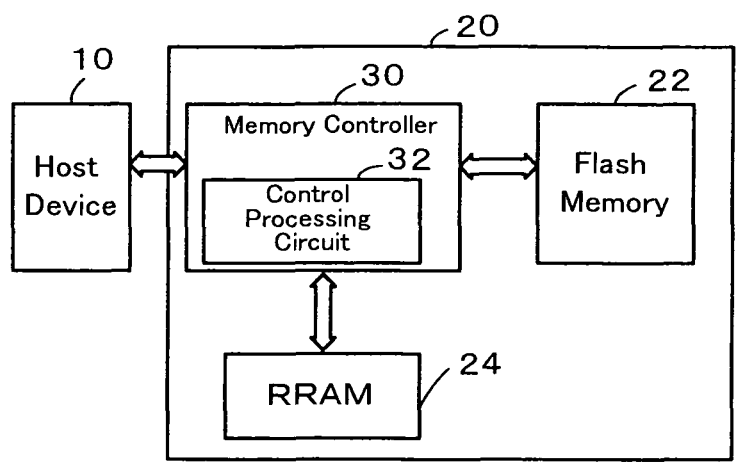
FIG. 1 schematically illustrates one configuration of a SSD (Solid State Drive) 20 storing data from a host device 10, for example, personal computer.

FIG. 1 schematically illustrates one configuration of a SSD (Solid State Drive) 20 storing data from a host device 10, for example, personal computer. The SSD 20 is configured as a large-capacity data storage storing application programs and data. The SSD 20 has a flash memory 22 configured as a NAND type flash memory, RRAM 24 configure as a resistance random access memory, a memory controller 30 configured as a control device controlling the flash memory 22 and the RRAM 24.

The flash memory 22 is configured as a NAND type flash memory having a flash memory cell array (not illustrated) that has a plurality of flash memory cells that a threshold voltage varies by electrons injection into a floating gate or by drawing electrons away from the floating gate. In addition to the flash memory cell array, the flash memory 22 has a Law decoder, a column decoder, a sense amplifier and so on (all not illustrated). In the flash memory 22, data is written or read out in a page (in this embodiment, one page corresponds to 8 kbyte), and the stored data is erased in a block (in this embodiment, one block corresponds to 1 M byte). In this embodiment, write speed in writing data to the flash memory 22 and read out speed in read out data from the flash memory 22 is respectively set to be 212 MB/S.

Figure 2:
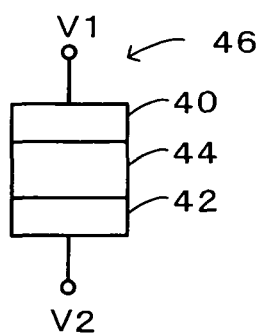
FIG. 2 schematically illustrates one configuration of resistance random access memory 46.

The RRAM 24 is configured as a RRAM having a RRAM cell array (not illustrated) that has a plurality of RRAM cells. The RRAM cell has a resistance memory element 46 illustrated in FIG. 2 and the MOS transistor (not illustrated) connected with the resistance memory element 46. The resistance memory element 46 is configured to have a metal oxide 44 between a top electrode 40 formed by metal, for example, titanium (Ti) or platinum (Pt), and a bottom electrode 42 formed by metal, for example, titanium (Ti) or platinum (Pt). The RRAM 24 further has a Law decoder, a column decoder, a sense amplifier and so on (all not illustrated). The RRAM cell is configured as an element performing a bipolar operation. In the bipolar operation, the RRAM cell is set (lowered resistance thereof) when voltage V1 applied in the top electrode 40 is higher than voltage V2 applied in the bottom electrode 42. The RRAM cell is reset (raised resistance thereof) when voltage V1 is lower than voltage V2. In general, the RRAM cell performing such a bipolar operation is comparatively fast operation and low power element. So the RRAM 24 is configured to be comparatively fast operation and low power element. It is considered that metal oxide, for example, titanium oxide (TiOx), nickel oxide (NiOx), copper oxide (CuOx), hafnium oxide (HfOx) or stricter by stacking a polarity of this metal oxide is preferred. In the RRAM 24 configured above, the write speed in writing data to the RRAM 24 and read out speed in reading out data from RRAM 24 are faster than these of flash memory. In this embodiment, write speed and read out speed is set to be 1.25 GB/s.

The memory controller 30 has a control processing circuit 32 configured to be a logic circuit having a plurality of logic element. The control processing circuit 32 executes controls and arithmetic processing. The control processing circuit 32 is input control signals and data from the host device 10. The control processing circuit 32 controls the flash memory 22 and the RRAM 24 to store data respectively based on the input control signal, controls the flash memory 22 and the RRAM 24 to read out data respectively based on the input control signal, and outputs the read out data to the host device 10. The memory controller 30 exchanges control signals and data with the host device 10 comparatively fast (for example, about 1.25 GB/S).

Figure 3:
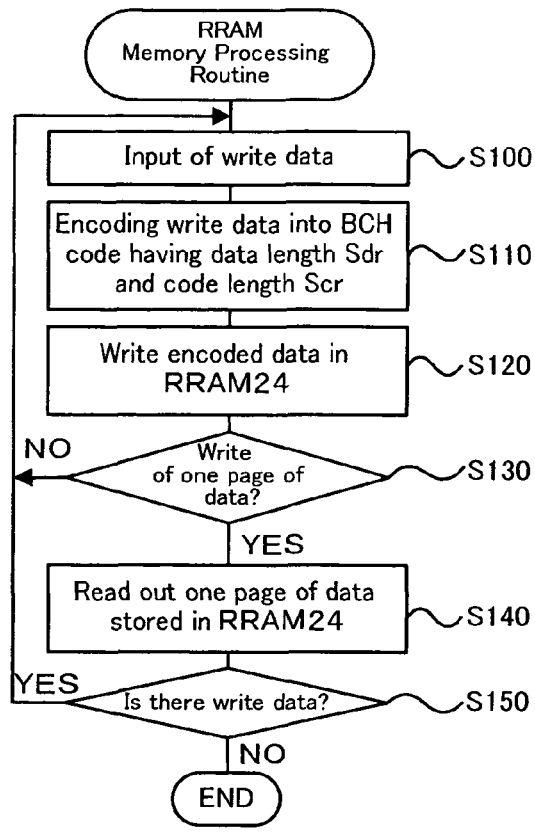
FIG. 3 schematically illustrates a flow chart showing RRAM memory processing routine executed by memory controller 30 of the SSD 20.
Figure 4:
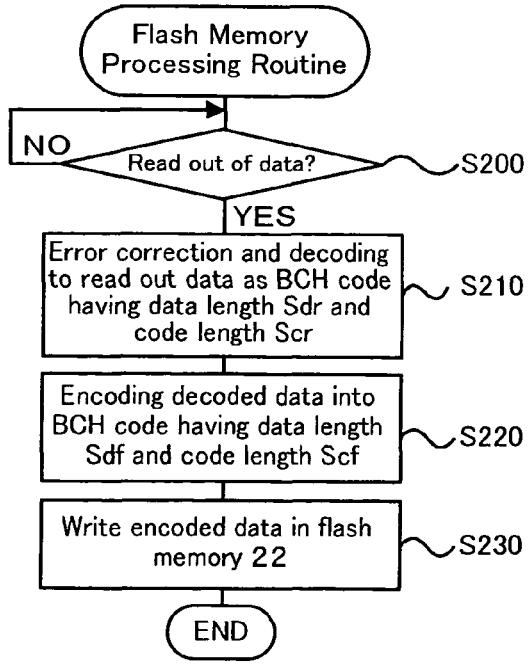
FIG. 4 schematically illustrates a flow chart showing flash memory processing routine executed in parallel with the RRAM processing routine.

Next, the operation of the SSD 20 configured above especially in storing data input from the host device to the flash memory 22 and in outputting data stored in flash memory 22 to the host device 10 is described below. First, the operation in storing data input from the host device to the flash memory 22 is described below. FIG. 3 schematically illustrates a flow chart showing RRAM memory processing routine executed by memory controller 30 of the SSD 20. FIG. 4 schematically illustrates a flow chart showing flash memory processing routine executed in parallel with the RRAM processing routine. These routines are executed when write request signal requesting to write data from the host device 10 to the flash memory 22.

At first RRAM memory processing routine is described. When the RRAM memory processing routine is executed, the memory controller 30, as illustrated FIG. 3, executes processing inputting write data from the host device (step S100). Then every time size of the write data input from the host device becomes data length Sdr (for examples, 256 bit, 512 bit, 1K Byte etc.), input write data is encodes into BCH (Bose-Chaudfuri-Hocquenghem) code with code length Scr (for example, 2K byte, 3K byte, 4K byte etc.) (step S110), and RRAM 24 is controlled to store the encoded data (step S120). The data length Sdr and the code length Scr are respectively set to be predefined values of data length and code length that is used to shorten time required for the processing of encoding write data or decoding encoded data comparatively and that is used to lower consumption power in the memory controller 30 in encoding write data or decoding encoded data.

After encoded data is stored to the RRAM 24, until the number of BCH code stored RRAM 24 reaches number of BCH codes (step S130) that becomes data of one page of flash memory after being decoded (in this embodiment, 8K byte), the processes from step S100 to step S130 are repeated. Thus the control processing circuit 32 performs to encode input data from the host device 10 into BCH code sequentially and stores the encoded data to the RRAM 24.

When the number of BCH code that becomes data of one page of flash memory after being decoded are stored to RRAM 24, the number of BCH code that becomes data of one page of flash memory after being decoded are read out (step S140), it is determined whether write data from the host device 10 is input or not (step S150). When the write data from the host device 10 is input, the processes from step S100 to step S140 are repeated. When the write data from the host device 10 is not input, this routine is terminated. Thus every time the number of BCH code that becomes data of one page of flash memory after being decoded are stored to RRAM 24, data is read out from the RRAM 24.

Next, the flash memory processing routine is described below. When the flash memory processing routine is executed, the control processing circuit 32 of the memory controller 30, as illustrated FIG. 4, waits until data read out from the RRAM 24 by the process of step S140 described above (step S200). When the data is read out from the RRAM 24, the control processing circuit 32 performs error correction and decoding to the read data as BCH code having the data length Sdr and the code length Scr (step S210). Thus error correction is performed when the error is occurred in the data stored in the RRAM 24.

After decoding data, every time size of the decoded data becomes data length Sdf (for examples, 26K byte, 28K byte, 30K byte etc.), decoded data is encodes into BCH code with code length Scf (for example, 30K byte, 32K byte, 34K byte etc.) (step S220). The data length Sdf is set to be predefined value that is able to correct more errors than BCH code having the code length Scr.

After decoding data, the flash memory 22 is controlled to store the encoded data (step S230), and this routine is terminated. This process performs to store encoded data, i.e., BCH code having the data length Sdf and the code length Scf to the flash memory 22.

By executing the RRAM memory processing routine as illustrated in FIG. 3 and the flash memory processing routine as illustrated in FIG. 4, the control processing circuit 32 performs to encode input data from the host device 10 into BCH code sequentially and control RRAM 24 to store the encoded data to the RRAM 24 with encoding the read data from the RRAM 24 into BCH code and storing the encoded data to the flash memory 22. Thus sequential inputting data from the host device 10 is accomplished without waiting for the process controlling the flash memory 22 to store data to the flash memory 22. Compared with SSD sequential inputs data from the host device 10 with waiting for the process controlling the flash memory 22 to store data to the flash memory 22, high speed data writing from the host device 10 to the flash memory 22 is accomplished. So more proper and higher speed data writing from the host device 10 to the flash memory 22 is accomplished.

Next, operation in outputting data stored in the flash memory 22 to the host device 10 is described below. FIG. 5 schematically illustrates a flow chart showing read out processing routine executed by memory controller 30 of the SSD 20. This routine is executed when read out request signal requesting to read out data stored in the flash memory 22 to the host device 10.

When the read out processing routine is executed, the control processing circuit 32 of the memory controller 30 executes processing that reads out BCH code corresponding to one page of data (step S300). After reading out data, the read data is performed error correction and decoding as BCH code having the data length Sdf and the code length Scf (step S310). Then decoded data is output to the host device 10 (step S320), then this routine is terminated. By this process, error correction and outputting data to the host device 10 are performed when the error is occurs in data stored in the flash memory 22. Thus outputting more correct data to the host device 10 is accomplished.

In the SSD 20 of the embodiment, the SSD 20 performs to encode input data from the host device 10 into BCH code having data length Sdr and code length Scr sequentially and stores the encoded data to the RRAM 24 when the write requesting signal is input from the host device 10. When the number of BCH code that becomes data of one page of flash memory after being decoded is stored to RRAM 24, the SSD 20 performs to read out data from the RRAM 24, performs error correction and decoding to the read data as BCH code having the data length Sdr and the code length Scr, and performs to store the encoded data to the flash memory 22. Thus more proper and higher speed data writing from the host device 10 to the flash memory 22 is accomplished. Also in controlling the flash memory 22 to store decoded data, the SSD 20 encodes the decoded data into BCH code having the data length Sdf and the code length Scf and controls the flash memory 22 to store the encoded data. When the read out requesting signal is input from the host device 10, the SSD 20 performs error correction and decoding to data as BCH code having the data length Sdf and the code length Scf, and outputs the decoded data to the host device 10. Thus outputting more correct data to the host device 10 is accomplished.

In the SSD 20 of the embodiment, the SSD 20 encodes data into BCH code in the processes of step S110 and step S220. The code used for error correction is not restricted to BCH code. The block code such as Reed-Solomon code or the convolutional code such as LDPC code is allowed to be used as code for error correction.

In the SSD 20 of the embodiment, the SSD 20 performs to read out data from the RRAM 24 when the number of BCH code that becomes data of one page of the flash memory 22 after being decoded is stored to RRAM 24 in the processes of step S130 and step S140. Data size of threshold size for reading out BCH code stored in RRAM 24 is not restricted to the number of BCH code that becomes data of one page of flash memory 22 after being decoded. The number of BCH code that becomes data of two pages of flash memory 22 after being decoded is allowed to be used as the data size of threshold size for reading out BCH code stored in RRAM 24.

In the SSD 20 of the embodiment, the SSD 20 performs to encode input data from the host device 10 into BCH code having data length Sdr and code length Scr in the process of step S110. In the RRAM 24, more number of write and erase times that is a sum of times of writing data to the RRAM 24 and times of erasing data in the RRAM 24 causes the RRAM 24 to deteriorate and errors to occur in data stored in RRAM 24 easily. The SSD 20 counts the number of write and erase times, and sets the data length Sdr and the code length Scr to tend to be longer as the counted number of write and erase times for the RRAM 24 increases, encodes data into BCH code having the set data length Sdr and the set code length Scr. Thus error collection to more errors is accomplished. Reason why setting the data length Sdr and the code length Scr to tend to be longer as the counted number of write and erase times accomplishes to correct more error is described below. FIG. 6 schematically illustrates the configuration of generation of bit error in data stored in the RRAM 24. In FIG. 6, symbol of 'x' shows location of error in data. For example, the SSD 20 is set to encode write data sequentially into BCH code having 512 byte of the data length Sdr and (512 byte+104 bit) of the code length by adding 104 bit of parity bit to 512 byte of write data. Also, 9 bit of bit error are set to occur in read out BCH code from the RRAM 24 at first, and then 2 bit of bit error are set to occur in read out BCH code from the RRAM 24, i.e., 11 bit of bit error is set to occur in read out BCH code from the RRAM 24. This BCH code is able to correct till 8 bit of bit error. 9 bit of bit error occur in first read data. So BCH code having code length Scr is not able to perform error correction. The data length Sdr is set to be 1K byte, the code length Scr is set to be (1K byte+210 bit), and the SSD 20 is set to encode write data sequentially into BCH code having 1K byte of the data length and (1K byte+210 bit) of code length Scr by adding 210 bit of parity bit to 1K byte of write data. Thus BCH code is able to correct till 15 bit of bit error and error correction for 11 bit of error is accomplished. Setting the data length Sdr and the code length Scr to tend to be longer accomplishes to correct more error. Setting the data length Sdr and the code length Scr to tend to be longer as the counted number of write and erase times accomplishes to correct more error.

In the SSD 20 of the embodiment, the SSD 20 encodes the decoded data into BCH code having the data length Sdf and the code length Scf. In the flash memory 22, more number of write and erase times that is a sum of times of writing data to the flash memory 22 and times of erasing data in the flash memory 22 causes the flash memory 22 to deteriorate and errors to occur in data stored in flash memory 22 easily. The SSD 20 counts the number of write and erase times, and sets the data length Sdf and the code length Scf to tend to be longer as the counted number of write and erase times for the flash memory 22 increases, encodes data into BCH code having the set data length Sdf and the set code length Scf. Thus error collection to more errors is accomplished.

In the SSD 20 of the embodiment, the SSD 20 is set to have the flash memory 22. The SSD 20 is allowed to have other nonvolatile memory storage, for example, hard disk drive etc., instead of the flash memory 22. In the case of hard disk drive, more number of write and erase times does not cause the hard disk to deteriorate. So the process that the hard disk drive is controlled to store the decoded data without encoding the decoded data into BCH code is executed instead of execution of step S220 and step S230 of the flash memory processing routine in FIG. 4.

In the SSD 20 of the embodiment, the SSD 20 is set to have the RRAM cell configured as an element performing a bipolar operation. The RRAM cell is allowed to be configured as an element having the resistance memory element 46 and a diode (not illustrated) and performing a unipolar operation. In the unipolar operation, the RRAM cell is set (lowered resistance thereof) when voltage V1 is higher than voltage V2. The RRAM cell is reset (raised resistance thereof) when voltage V1 is higher than voltage V2 and lower than a voltage setting the RRAM cell to be set. In general, the RRAM cell performing such a unipolar operation is configured to have smaller cell size and simple configuration than the RRAM cell performing such a bipolar operation. Thus smaller area of the RRAM 24 and smaller SSD 24 is accomplished.

In the SSD 20 of the embodiment, the SSD 20 is set to have the RRAM 24. The SSD 20 is allowed to have other nonvolatile random access memory, for example, a ferroelectric random access memory having a capacitor with a ferroelectric material sandwiched by two electrodes, a magnetoresistive random access memory having a MTJ element structured by sandwiching a magnetoresistive film by magnetic films, or a phase change random access memory having an element structured by sandwiching a phase change material by two electrodes.

In the SSD 20 of the embodiment, the SSD 20 is set to transfer data with the host device 10 configured as a personal computer. The host device 10 is not restricted to a device configured as a personal computer. Any device being able to transfer data with the SSD 20, for example, a cellular phone, a digital still camera is allowed to be used as the host device 10.

The primary elements in the embodiment and its modified examples are mapped to the primary constituents in the claims of the invention as described below. In the control device of the present invention, the control processing circuit 32 of the memory controller 30 executing the processes from step S100 to step S120 of the RRAM memory processing routine in FIG. 3 arranged to encode input data from the host device 10 into BCH code having the data length Sdr and the code length Scr sequentially and to control RRAM 24 to store the encoded data when the write requesting signal is input from the host device 10 in the embodiment and its modified examples is equivalent to the 'memory processing unit for the second storage'. The control processing circuit 32 of the memory controller 30 executing the processes of step S130 and step S140 of the RRAM memory processing routine in FIG. 3 arranged to control the RRAM 24 to read out data when the number of BCH code that becomes data of one page of flash memory after being decoded is stored to RRAM 24 in the embodiment and its modified examples is equivalent to the 'read processing unit for the second storage memory processing unit for the second storage'. The control processing circuit 32 of the memory controller 30 executing the processes from step S210 to step S230 of the flash memory processing routine in FIG. 4 arranged to perform error correction and decoding to the read data as BCH code having the data length Sdr and the code length Scr and to control the flash memory 22 to store the encoded data in the embodiment and its modified examples is equivalent to the 'memory processing unit for the first storage'. In the first data storage of the present invention, the flash memory 22 in the embodiment and its modified examples is equivalent to the 'flash memory'. The RRAM 24 in the embodiment and its modified examples is equivalent to the 'second storage'. In the second data storage of the present invention, the hard disk drive in the modified embodiment and its modified examples is equivalent to the 'hard disk drive'. The RRAM 24 in the embodiment and its modified examples is equivalent to the 'second storage'.

There may be many modifications, changes, and alterations without departing from the scope or spirit of the main characteristics of the present invention. The scope and spirit of the present invention are indicated by the appended claims, rather than by the foregoing description.

The technique of the present invention is preferably applied to the manufacturing industries of control device and data storage.

The disclose of Japanese Patent Application No. 2010-180282 filed Aug. 11, 2010 including specification, drawings and claims is incorporated herein by reference in its entirety.

What is claimed is:

1. A control device configured to control data transfer between a host device, a first storage configured as a nonvolatile storage for storing data, and a second storage configured as a nonvolatile random access memory having faster write speed than the first storage, the control device comprising:
- a memory processing unit for the second storage configured to encode input data from the host device sequentially into an error correcting code for the second storage and control the second storage to store the encoded data to the second storage sequentially when a write request signal requesting to write data to the first storage is input from the host device;
- a read processing unit for the second storage configured to control the second storage to read out data of a predetermined size stored in the second storage when a size of data stored in the second storage reaches the predetermined size;
- a memory processing unit for the first storage configured to perform error correction and decoding on the read data as the error correcting code for the second storage, and control the first storage to store the decoded data;
- a number of writes and erases counting unit for the second storage configured to count a number of writes and erases for the second storage, the number of writes and erases for the second storage being a sum of the number of writes of data in the second storage and the number of erases of data stored in the second storage; and
- a code length of data setting unit configured to set a data length for execution and a code length for execution to tend to be longer as the number of writes and erases for the second storage increases, the data length for execution being a length of input data from the host device encoded into the error correcting code for the second storage, the code length for execution being a code length of input data from the host device encoded into the error correcting code for the second storage;
- wherein the memory processing unit for the second storage encodes the input data from the host device into the error correcting code for the second storage having the set data length for execution and the set code length for execution, and
- the memory processing unit for the first storage performs error correction and decoding on the read data as the error correcting code for the second storage having the set data length for execution and the set code length for execution.

2. The control device in accordance with claim 1, wherein the error correcting code for the second storage is any one of BCH code, block code or convolutional code.

3. The control device in accordance with claim 1, wherein the predetermined size is a size of the error correcting code for the second storage corresponding to a preset size as a size of data written in the first storage in one write processing.

4. A data storage device configured to store data, the data storage device comprising:
- a control device in accordance with claim 1, wherein
- the first storage is a flash memory.

5. The data storage in accordance with claim 4, wherein the second storage is any one of a resistance random access memory, a ferroelectric random access memory, a magnetoresistive random access memory, or a phase change memory.

6. A data storage device configured to store data, the data storage device comprising:
- a control device in accordance with claim 1, wherein
- the first storage is a hard disk drive.

7. The data storage in accordance with claim 6, wherein the second storage is any one of a resistance random access memory, a ferroelectric random access memory, a magnetoresistive random access memory, or a phase change memory.

8. A control device configured to control data transfer between a host device, a first storage configured as a nonvolatile storage for storing data, and a second storage configured as a nonvolatile random access memory having faster write speed than the first storage, the control device comprising:
- a memory processing unit for the second storage configured to encode input data from the host device sequentially into an error correcting code for the second storage and control the second storage to store the encoded data to the second storage sequentially when a write request signal requesting to write data to the first storage is input from the host device;
- a read processing unit for the second storage configured to control the second storage to read out data of a predetermined size stored in the second storage when a size of data stored in the second storage reaches the predetermined size;
- a memory processing unit for the first storage configured to perform error correction and decoding on the read data as the error correcting code for the second storage, and control the first storage to store the decoded data;
- a read processing unit for the first storage configured to control the first storage to read out data stored in the first storage and to output the read data to the host device when a readout request signal requesting to read out data stored in the first storage is input from the host device;
- a number of writes and erases counting unit for the first storage configured to count a number of writes and erases for the first storage, the number of writes and erases for the first storage being a sum of the number of writes of data in the first storage and the number of erases of data stored in the first storage; and
- a code length of data setting unit for the first storage configured to set a data length for execution for the first storage and a code length for execution for the first storage to tend to be longer as the number of writes and erases for the first storage increases, the data length for execution for the first storage being a length of decoded data encoded into the error correcting code for the first storage, the code length for execution for the first storage being a code length of the decoded data encoded into the error correcting code for the first storage;
- wherein the memory processing unit for the first storage encodes the decoded data into an error correcting code for the first storage and controls the first storage to store the encoded data to the first storage, the error correcting code for the first storage correcting more errors than the error correcting code for the second storage corrects,
- wherein the read processing unit for the first storage performs error correction and decoding on the read data as the error correcting code for the first storage, and outputs the decoded data to the host device,
- wherein the memory processing unit for the first storage encodes the decoded data into the error correcting code for the first storage having the set data length for execution for the first storage and the set code length for execution for the first storage, and
- the read processing unit for the first storage performs error correction and decoding on the read data as the error correcting code for the first storage having the set data length for execution for the first storage and the set code length for execution for the first storage.

9. The control device in accordance with claim 8, wherein the error correcting code for the first storage is any one of BCH code, block code or convolutional code.

* * * * *